(12) United States Patent
Cothern et al.

(10) Patent No.: US 6,199,735 B1
(45) Date of Patent: Mar. 13, 2001

(54) PIVOTAL VEHICULAR LOAD CARRYING RACK

(76) Inventors: Charles K. Cothern, 15170 Steinbeck La., Colorado Springs, CO (US) 80921; Charles D. Manthei, 1615 Baylor Dr., Colorado Springs, CO (US) 80909; Charles E. Waid, 2619 Tomah Ct., Colorado Springs, CO (US) 80918

( * ) Notice: Subject to any disclaimer, the term of this patent is extended or adjusted under 35 U.S.C. 154(b) by 0 days.

(21) Appl. No.: 09/387,712

(22) Filed: Aug. 21, 1999

Related U.S. Application Data

(63) Continuation-in-part of application No. 09/132,459, filed on Aug. 11, 1998, now abandoned.

(51) Int. Cl.[7] .................................................. B60R 11/00
(52) U.S. Cl. ............................................................ 224/509
(58) Field of Search ............................... 224/503, 506, 224/509

(56) References Cited

U.S. PATENT DOCUMENTS

| | | | |
|---|---|---|---|
| 5,518,159 | * | 5/1996 | DeGuevara ........................... 224/506 |
| 5,664,717 | * | 9/1997 | Joder ..................................... 224/509 |
| 5,884,826 | * | 3/1999 | Shaver .................................. 224/509 |
| 6,085,954 | * | 7/2000 | Bloemer et al. ...................... 224/509 |

* cited by examiner

*Primary Examiner*—Stephen P. Garbe
(74) *Attorney, Agent, or Firm*—Richard W. Hanes

(57) ABSTRACT

A load carrying rack for vehicles having hinged rear doors or windows that is adapted to be positioned close to the rear of the vehicle during travel but can be manually swung or rotated out of the way of the door or window operation when access to the rear of the vehicle is desired, comprising a cantilever beam securable to the vehicle and extending rearwardly of the vehicle frame, a load carrying bracket proximate the rear accesses of the vehicle and extending rearwardly and longitudinally of the vehicle, a plurality of arms interconnecting the bracket and the cantilever beam and having at least one pivotal interconnection therebetween, whereby the load carrying bracket is rotatable about the pivotal interconnection to a position away from interference with the opening and closing of the rear accesses of the vehicle, including the trunk lids, doors and windows. An alternative embodiment is also disclosed wherein the load carrying bracket is replaced with a receiving hitch mounted on one of the plurality of arms so as to accommodate the use of a prior art load carrier with the pivotal arm assembly.

5 Claims, 7 Drawing Sheets

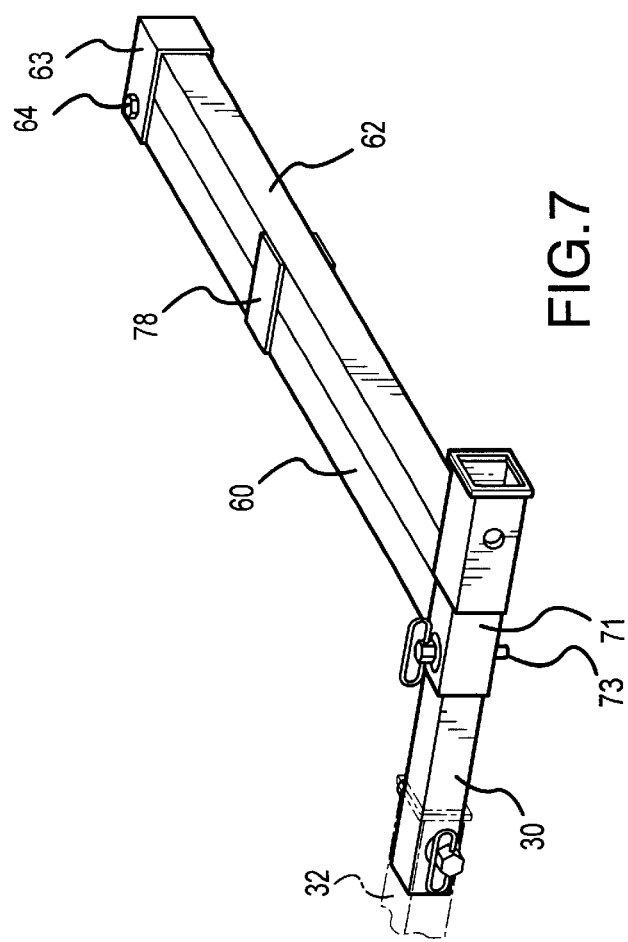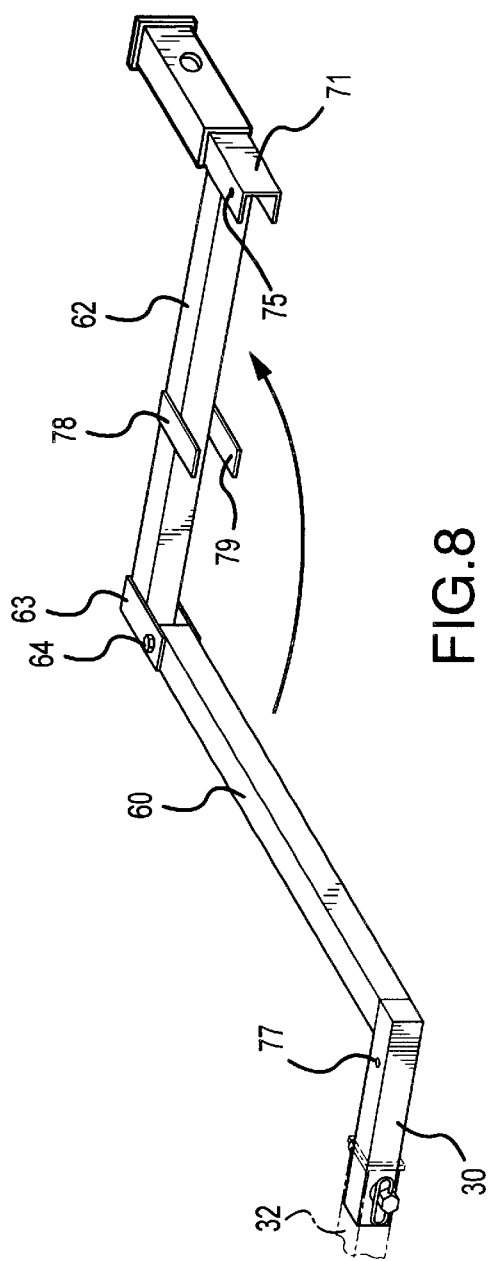

ns for vehicles and more particularly to bicycle racks for vans and other types of vehicles having rearwardly opening doors and windows.

BACKGROUND OF THE INVENTION

Rear end mounted bicycle racks for vans and other types of vehicles that have rearwardly opening doors and windows are known. The racks have traditionally been mounted directly on the vehicle's trunk lids, rear windows or bumpers or built on a cantilever beam that is inserted into a rectangular tube that primarily serves as a trailer hitch. The tube is secured to the vehicle frame and is disposed along the longitudinal axis of the vehicle so as to extend to the rear end of the vehicle. The problem with rear end mounted bicycle racks on these type of vehicles is the potential interference between the rack and the open position of the doors or windows.

The solution to the problem has been a singular one. Lengthen the cantilever beam so that the bicycles are carried outside the radius of the door and window travel. This resolution of the problem, however, creates yet other problems. The bicycle load is so far rearward of the vehicle that the effective length of the vehicle is extended by six feet or so. Additionally, the extended cantilever beam becomes insecure and flexible, creating an unstable load.

Accordingly, it is the primary object of the present invention to provide a rear end mounted bicycle rack for vehicles in which access to the rear end of the vehicle through trunk lids, rear doors or windows is desired.

Another object of the invention is to provide a rear end mounted bicycle rack for a vehicle that supports one or more bicycles close to the rear end of the vehicle.

A further object of the invention is to provide a load carrying rack for a vehicle that is selectively pivotal so as to permit the load carrying rack to be swung from a storage position to an entry access position, the later permitting the rear doors or windows of the vehicle to be accessible without dismounting the load and without interference with the opening and closing of the rear doors or windows of the vehicle.

Another object of the invention is to provide a pivotal supporting frame assembly that will carry an adapter to receive the upright post of a prior art nonpivotal load carrying rack, thus providing the advantages of the invention for a rack already owned by a user.

Other and still further objects, features and advantages of the present invention will become apparent upon a reading of the following specification, taken together with the accompanying drawings.

DESCRIPTION OF THE DRAWINGS

FIG. 7 is a perspective view of a second alternative form of the invention where the adapter socket is mounted on the second pivotal arm in a position that is co-axial with the cantilever beam. The pivotal arms are shown in a closed, or travel, position.

FIG. 8 is a perspective view of the apparatus shown in FIG. 7 where the pivotal arms are in the open position.

DETAILED DESCRIPTION OF THE INVENTION

Figure 1:
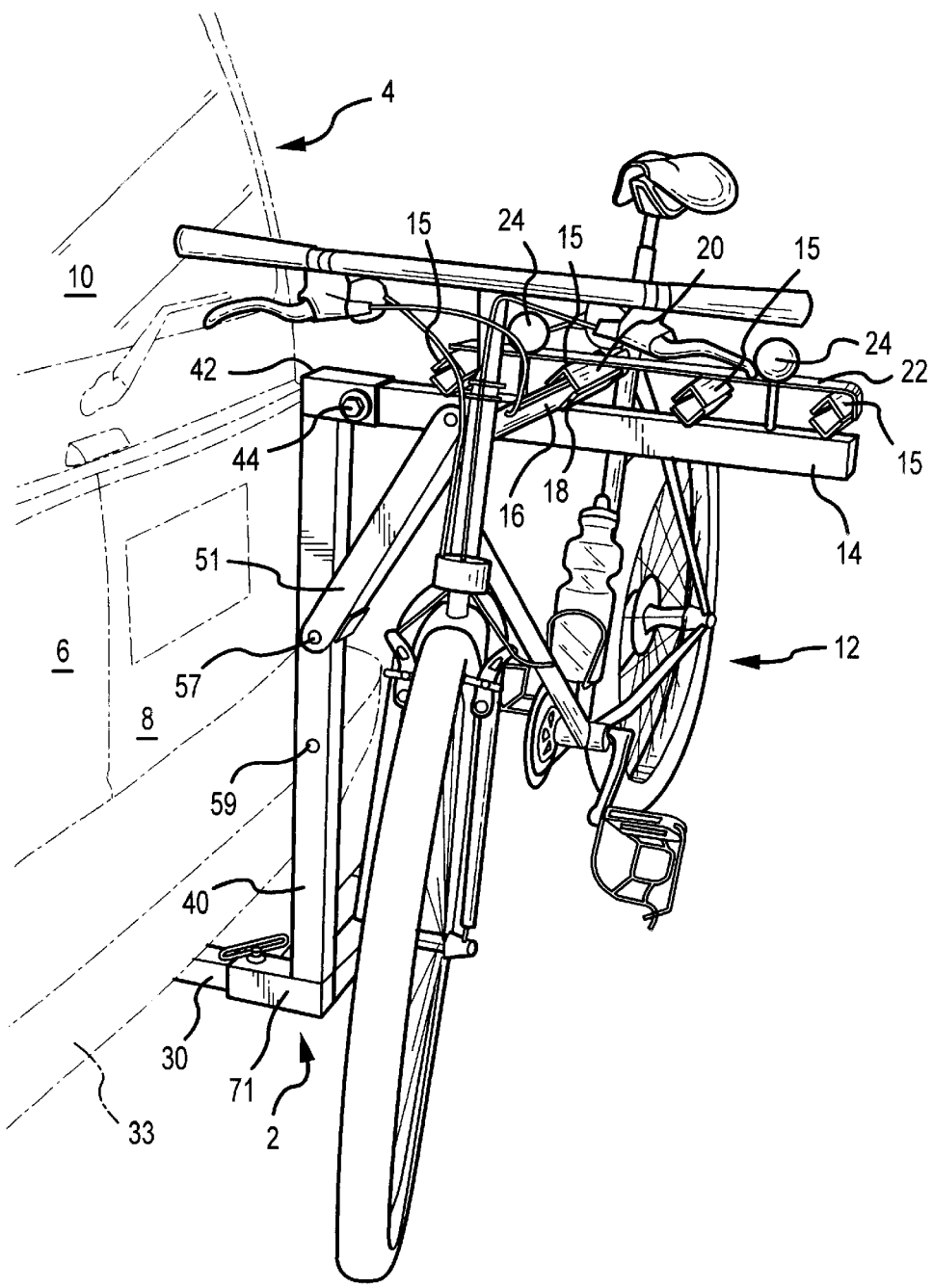
FIG. 1 is a perspective view of the load carrying rack of the present invention as mounted on the rear end of a van type vehicle, shown in dashed lines. The load depicted in FIG. 1 is one bicycle, however up to four bicycles can be carried on the rack that is illustrated. The rack is shown in its storage position, that is, in the driving or transporting mode.

Referring first to FIG. 1 the load carrying rack 2 of the present invention is shown attached to a van type of vehicle 4 that has doors 6 and 8 that open and close on substantially vertical hinges (not shown) and a window 10 that opens and closes on a top sided horizontal hinge (not shown). But for the elements of the present invention, it would be impossible to open the doors 6 and 8 and, depending on the structural characteristic of the load, opening of the window 10 might be a problem.

The load anticipated by the preferred form of the invention is one or more bicycles. A single bicycle 12 is shown in FIG. 1 as being carried by the horizontal and rearwardly (relative to the orientation of the vehicle) extending supporting bracket 14. A horizontal member 16 of the bicycle frame is anchored to the bracket 14 by a retaining clamp 15. The clamp comprises a "V" shaped elongated lower jaw member 18 that receives the horizontal frame member 16 of the bicycle. A similarly elongated "V" shaped upper jaw 20 is placed into position over the horizontal frame member and is secured in place by an overriding fastening bar 22 that is removably attached to the bracket 14 by a pair of thumb screws 24. While a plurality of holding clamps 15 may be spaced apart on the bracket 14 for holding several bicycles, four of the clamps is optimum. As seen in the drawing of FIG. 1, the bracket 14 extends rearwardly and longitudinally of the vehicle 4 while the bicycle retaining clamps 15 are mounted perpendicularly to the bracket. This orientation of the bracket 14 and the associated retaining clamps 15 is such as to position the general plane of the carried bicycles perpendicular to the longitudinal axis of the vehicle.

The base of the load carrying rack 2 is a cantilever beam 30 that is insertable into an elongated tube 32 (see FIGS. 2–4) found on most vehicles of the type described and primarily intended for use as a trailer hitch. The tubular hitch 32 is secured to the vehicle frame and positioned intermediate the two rear vehicle wheels. The cantilever beam 30 extends out of its carrying tube 32 rearwardly of the vehicle a distance sufficient to allow the vertically extending superstructure of the rack and its fastening attachments to clear the rear bumper 33 of the vehicle 4, thus keeping the rack 2 close to the rear end of the vehicle and avoiding the problems associated with longer cantilever beams.

Figure 2:
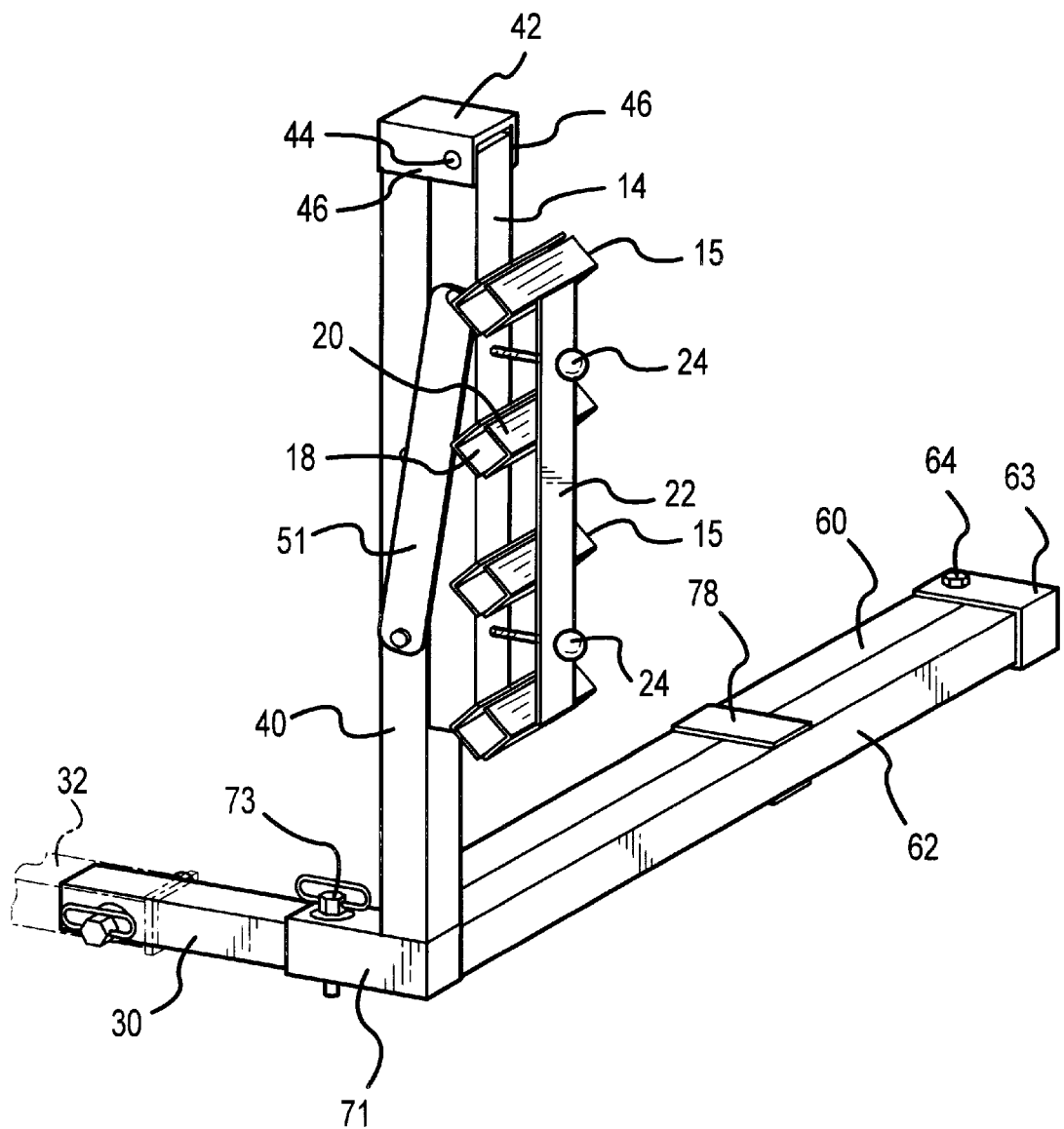
FIG. 2 is a perspective view of the load carrying rack of the present invention in its stowed position, where no load is being carried.
Figure 3:
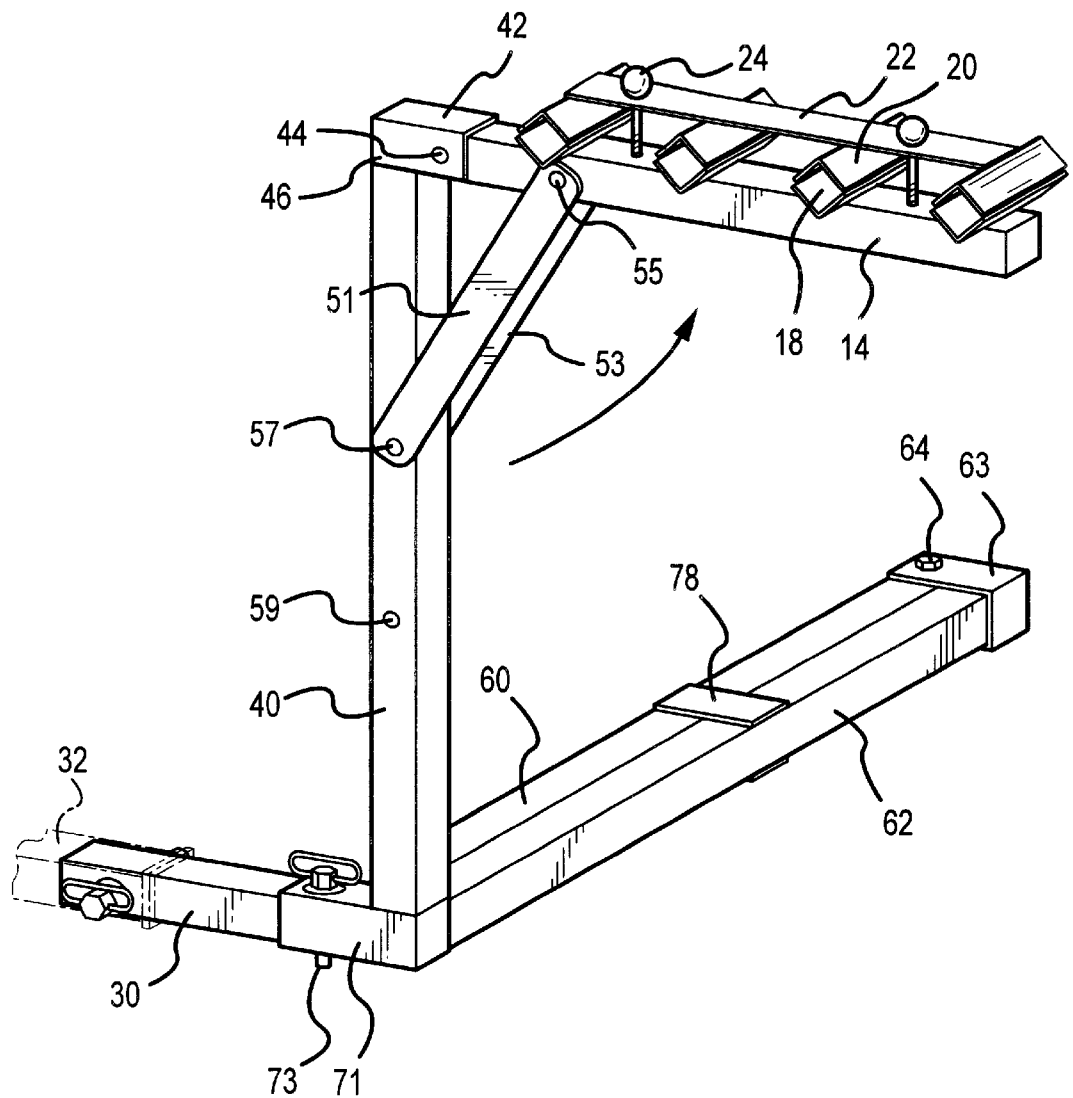
FIG. 3 is a perspective view of the load carrying rack, similar to FIG. 1, but without the bicycle and vehicle being shown, for clarity.
Figure 4:
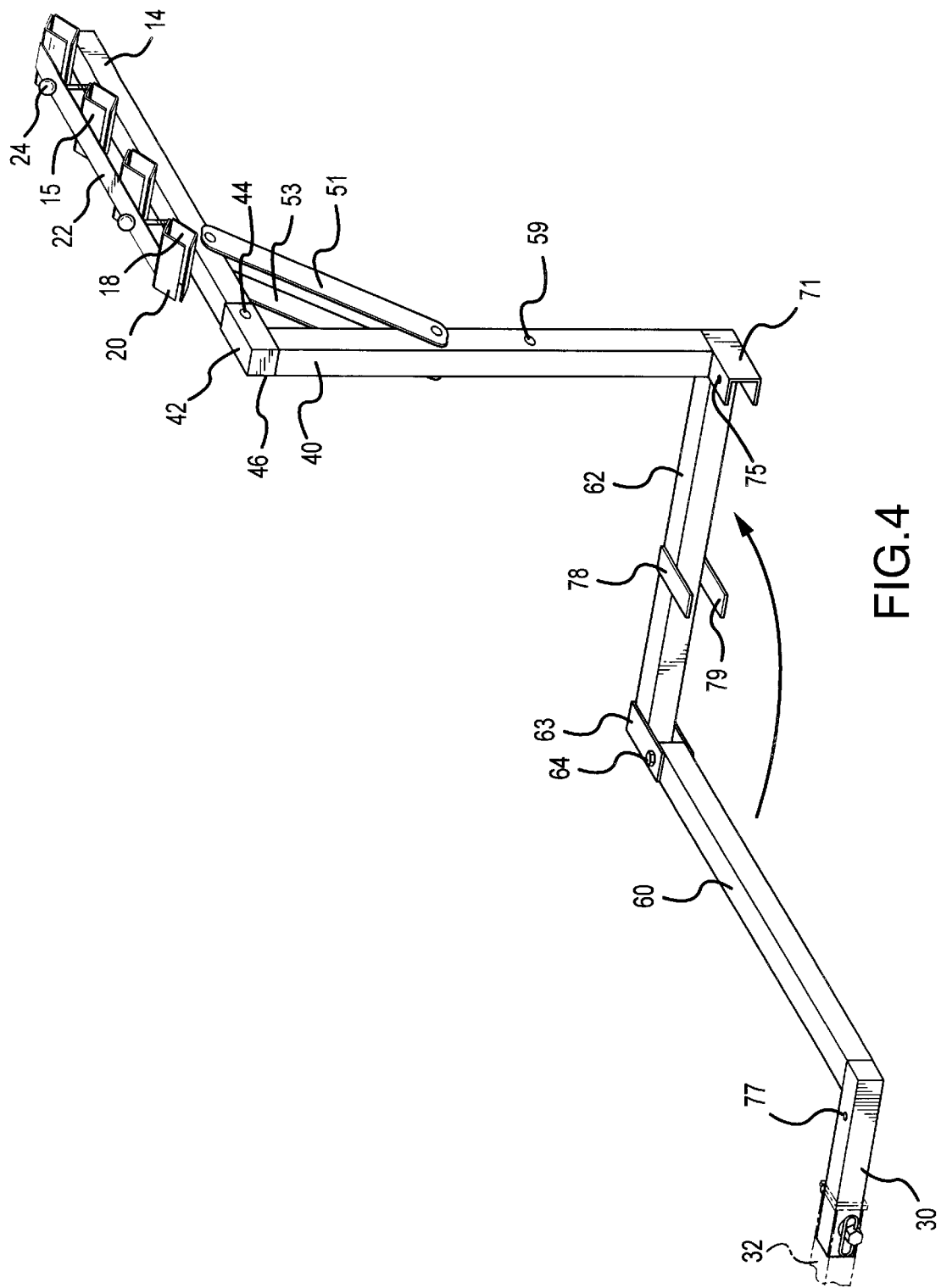
FIG. 4 is a perspective view of the load carrying rack of the present invention in an open or vehicle access mode.

The supporting bracket 14 is interconnected to the cantilever beam by a plurality of additional beams that elevate the supporting bracket 14 to the necessary height above the ground. Additionally the beams, through their pivotal interconnection, enable the rack to be swung away from the rear end of the vehicle when access to the vehicle through the trunk lids, rear doors or window is desired. The preferred structure to accomplish this feature of the invention is best shown in FIGS. 2–4.

Elevation of the supporting bracket 14 is provided by upright post 40, the upper end of which is pivotally attached to the inside end of the supporting bracket 14. A "U" shaped journal 42 is attached by welding or similar means to the upper end of the post 40. A connecting pin 44 is pivotally engaged through the supporting bracket 14 and is supported in opposing apertures in the downturned sides 46 of the journal 42. This pivotal connection between the upstanding post 40 and the bicycle supporting bracket 14 allows the bracket to be retracted when not in use carrying cargo so as to hang downwardly and parallel to the post 40, as shown in FIG. 2. When the supporting bracket 14 is positioned for use, as shown in FIGS. 1, 3 and 4, the bracket is manually pivoted to a horizontal position and locked in place by a pair of braces 51 and 53. Each of the braces is pivotally attached at one of their ends to the bracket 14 by a connecting pin 55 that penetrates the bracket and is disposed in opposing holes in the brace ends. The other ends of the braces are connected to the post 40 by a second connecting pin 57 that pierces the post and is disposed in opposing holes in the lower end of each of the braces. When it is desired to retract the supporting bracket 14 into the position shown in FIG. 2, the second connecting pin 57 is removed from the post, allowing the lower ends of the braces 51 and 53 to move downwardly on the post 40 as the bracket is retracted. When the bracket 14 is pivoted to a position that is parallel with the post 40, the second connecting pin is reinserted into the apertures in the lower ends of the braces and into a mating aperture 59 in the post. This attachment secures the bracket in its retracted position, as shown in FIG. 2.

The upright post 40 is attached to the cantilever beam through a pair of pivotally interconnected, similarly dimensioned arms 60 and 62. In order to accomplish the objective of swinging the load away from the rear door and window opening areas, the length of the arms needs to be equal to or greater that the width of the door that is to be cleared. The first arm 60 is butt welded at its first end, or otherwise securely fastened, at a right angle to the distal end of the cantilever beam 30. When the rack is mounted on a vehicle, the arm 60 is disposed perpendicularly to the longitudinal axis of the vehicle and parallel to the ground plane. The proximal end of the second arm 62 is attached to the second end of the first arm 60 by a pivotal connection. The pivotal connection is formed by a "U" shaped bracket 63 welded to the first end of the second arm 62 and an interconnecting pin 64. The stem sides of the "U" shaped bracket embrace the end of the arm 60 and receive the respective ends of the pin 64 that is inserted through an aligned aperture in the end of the first arm 60, forming the pivotal interconnection. The pivotal connection is designed to allow the second arm 62 to be positioned adjacent and parallel to the first arm 60 during the driving or travel mode. The connection also accommodates rotation of the second arm 62 to a position of at least ninety degrees from the first arm 60, as shown in FIG. 4. When the second arm 62 is rotated ninety degrees from the first arm 60, the bicycle supporting bracket 14 assumes a position parallel to the first arm 60 and the loaded bicycle/s is/are positioned laterally of and parallel to the side of the vehicle, well out of the way of the door opening circle.

To place the load back into the travel mode the second arm 62 is rotated toward the first arm 60 and into a position adjacent and parallel to the first arm. As additional stabilization and to provide a locking mechanism, a "U" shaped stabilizing bracket 71 is secured to the distal end of the second arm 62. In the travel mode, when the two arms are adjacent and parallel, the stem sides of the stabilizing bracket 71 embrace the distal end of the cantilever beam 30, transferring the load forces in the upright post 40 directly to the short cantilever beam. A locking pin 73 is disposed to penetrate aligned holes 75 in the stem sides of the stabilizing bracket and the aperture 77 in the cantilever beam. Additional stabilization and closing guidance may be effected by the use of two parallel plates 78 and 79 welded to the center portion of the second arm 62. These plates embrace the top and bottom sides of the first arm 60 and assist in transferring the load forces from the post 40 and the second arm 62 to the cantilever beam and the first arm 60. During the rotation of the second arm, from the open or access mode, as shown in FIG. 4, to the travel mode, the plates 78 and 79 assist in guiding the loaded second arm 62 into its proper position so that the open side of the stabilizing bracket 71 may more easily engage the distal end of the cantilever beam 30.

Figure 6:
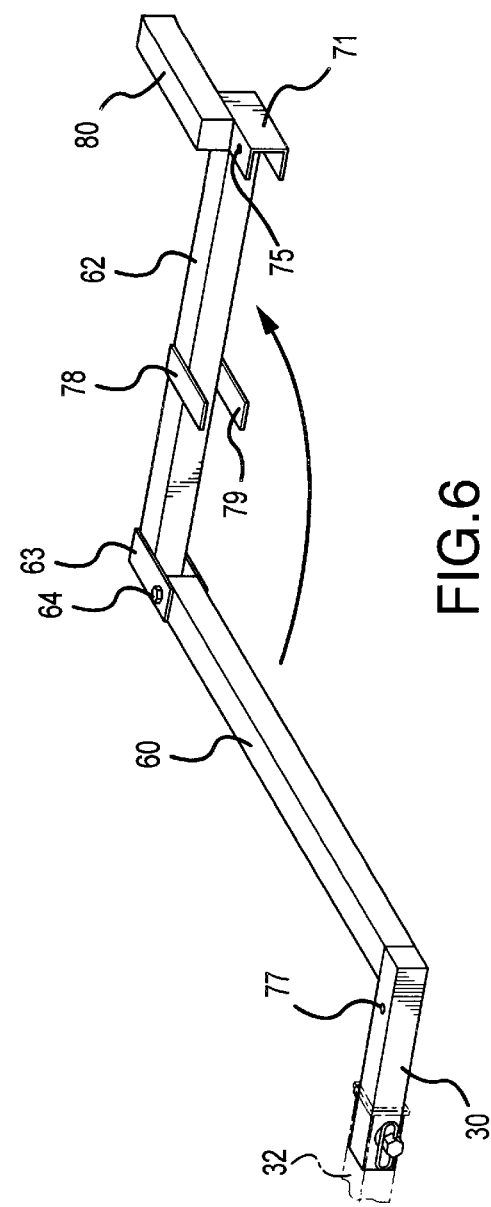
FIG. 6 is a perspective view of an alternative form of the present invention in the open or vehicle access position.
Figure 5:
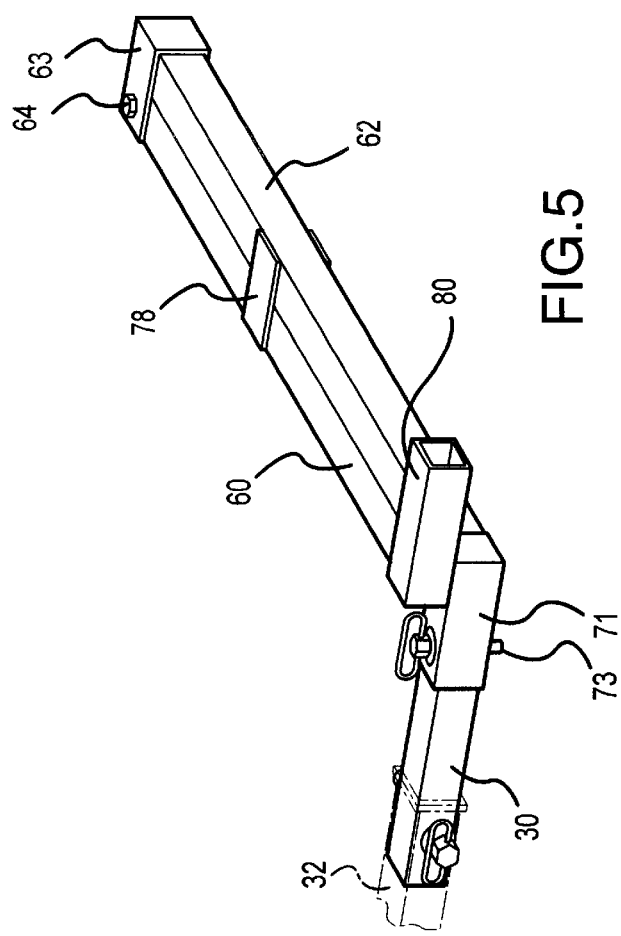
FIG. 5 is a perspective view of an alternative form of the present invention in a closed or stowed position.

An alternative form of the invention is shown in FIGS. 5 and 6 and is useful for providing the advantages of the pivotal interconnecting arms 60 and 62 to a prior art type of load carrier. The prior type of carrier referred to comprises an upright post, similar to the post 40 of the first mentioned embodiment, a horizontally disposed supporting bracket, similar to the bracket 14 of the preferred embodiment, and a connecting extension that is received in a tubular hitch mounted at the rear of a vehicle. The Bicycle Carrier disclosed in U.S. Pat. No. 5,690,260 is a good example of the prior art device referred to.

Exclusive use of the preferred form of the invention disclosed in this application would make obsolete the prior art type of carriers referred to above, of which there are a great number already in use. Accordingly, in the alternative embodiment of the present invention, the upright post 40 and the attached bracket 14 of the preferred embodiment are replaced by a tubular receiver 80 that is securely fastened, as by welding, bolting, or the like, to the second arm 62, preferably to the distal end thereof. By preference, the receiver is positioned at the end of the second arm so that the longitudinal axis of the receiver and the longitudinal axis of the cantilever beam lie in substantially the same vertical plane. However, wherever located on the second arm, the longitudinal axis of the receiver should be substantially parallel to a horizontal plane. The longitudinal axis of the receiver should also be parallel to the longitudinal axis of the vehicle when the arms 60 and 62 are in the closed position, as shown in FIG. 5.

In the preferred form of this alternative embodiment, as shown in FIGS. 5 and 6 of the drawings, the receiving socket 80 is welded or otherwise secured to the top side of the stabilizing bracket 71 that is mounted on the distal end of the second arm 62. However, whether the receiving socket 80 is mounted onto the stabilizing bracket 71 is immaterial as long as the receiver is secured to the second arm 62 is in such a fashion that when the arm is rotated, as shown in FIG. 6, the load, such as one or more bicycles, is moved into a position clear of the opening arc of the doors in the rear end of the vehicle. Locking means securing a connecting extension to the receiver 80 are preferable but have not been shown because a suitable locking device can take many forms within the skill of the art, including the one shown with respect to the preferred embodiment.

With the receiver 80 being carried by the pivotal arm assembly, as shown in the drawings, the connecting extension, or cantilever beam, of a prior art load carrier can be inserted into the receiver 80 in order to mount the prior art load carrier directly onto the pivotal assembly. Thereby, the pivotal assembly of the present invention does not make the prior art load carriers obsolete, but, on the contrary, they still may be used, acquiring at the same time the advantages of the present invention.

Figure 9:
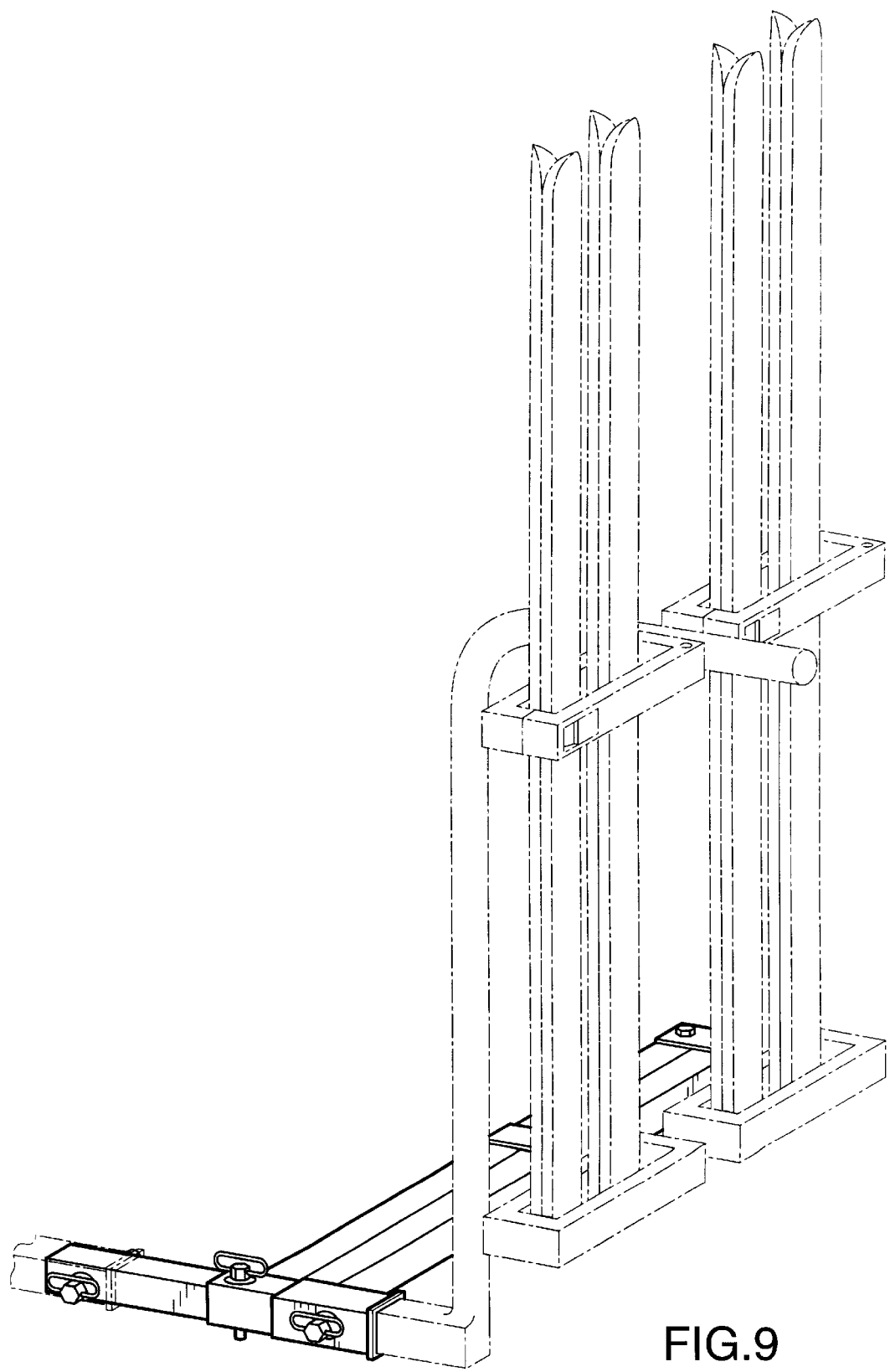
FIG. 9 is a perspective view of the apparatus of FIGS. 7 and 8 with a load carrying upright post shown in dotted lines as it would appear inserted into the socket adapter carried by the second pivotal arm.

FIGS. 7, 8 and 9 illustrate a second alternative embodiment of the invention where the receiver 80 is attached to the distal end of the second arm 62 so that the longitudinal axis of the receiver is co-axial with the longitudinal axis of the cantilever beam 30. FIG. 9 illustrates how the horizontal mounting beam of a prior art type of load carrier is inserted into the receiver 80. The illustrated load carrier is a ski rack, however a bicycle rack or similar load can use the adapter socket 80 to great advantage.

In the preferred form of the present invention, and in the alternative form, it is preferable to limit the rotation of the second arm 62, with respect the first arm 60, to substantially ninety degrees. Such limitation insures that an elongated type of load, such as one or more bicycles, will be restricted to an extended placement that is substantially parallel to the side of the vehicle and not rotating further to a position of interference with the vehicle.

The foregoing explanation of the functioning of the vehicle load demonstrates that the objects of the invention have been achieved. In the travel mode, the bicycles, or other type of load, are positioned close to the rear of the vehicle, eliminating a long and unstable cantilever mounting system and an excessively elongated vehicle profile. Equally important, the mounting of the present invention allows the load to be rotated out of the way of the vehicle's rear door and window operation and quickly restored to the travel mode without unloading and reloading the cargo.

We claim:

1. A load carrier mounting assembly for use with a vehicle having a socket type of hitch, comprising;

a cantilever beam having a longitudinal axis and inner and outer ends, where the inner end is sized and dimensioned for insertion into the socket of the hitch, a first supporting arm having proximal and distal ends, the proximal end thereof being angularly fixed in a horizontal plane to the outer end of the cantilever beam;

a second supporting arm having first and second ends;

a pivotal interconnection between the distal end of the first supporting arm and the first end of the second supporting arm for providing rotation of the second supporting arm in a horizontal plane from a first position that is parallel to the first arm to a second position that is substantially 90° to the first arm;

a receiving socket having a longitudinal axis, means attaching the receiving socket to the second supporting arm so that the longitudinal axis of the receiving socket is parallel to a horizontal plane and parallel to the longitudinal axis of the vehicle when the first and second arms are parallel to each other.

2. The combination of claim 1 where the receiving socket is attached to the second end of the second arm so that the longitudinal axis of the receiving socket and the longitudinal axis of the cantilever beam lie in substantially the same vertical plane.

3. The combination of claim 1 and further including means to interconnect the second end of the second arm to the proximal end of the first arm when the first and second arms are parallel to each other.

4. The combination of claim 3 where the interconnecting means includes a "U" shaped stabilizing bracket having stem sides and being secured to the second end of the second arm, wherein the stem sides embrace the distal end of the cantilever beam when the first arm and the second arm are parallel to each other.

5. The combination of claim 4 and further including a pair of parallel plates attached to the second arm and extending laterally thereof so as to embrace the first arm when the first and second arms are positioned so as to be parallel to each other.

\* \* \* \* \*